United States Patent
Campbell

(10) Patent No.: US 12,168,997 B2
(45) Date of Patent: Dec. 17, 2024

(54) SHAFT DISCONNECTS

(71) Applicant: Hamilton Sundstrand Corporation, Charlotte, NC (US)

(72) Inventor: Kris H. Campbell, Poplar Grove, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 913 days.

(21) Appl. No.: 17/234,531

(22) Filed: Apr. 19, 2021

(65) Prior Publication Data

US 2021/0239155 A1 Aug. 5, 2021

Related U.S. Application Data

(62) Division of application No. 15/487,160, filed on Apr. 13, 2017, now Pat. No. 10,982,710.

(51) Int. Cl.
*F16C 3/00* (2006.01)
*F16C 3/02* (2006.01)
*F16D 9/00* (2006.01)

(52) U.S. Cl.
CPC ............... *F16C 3/00* (2013.01); *F16C 3/023* (2013.01); *F16D 9/00* (2013.01)

(58) Field of Classification Search
CPC ..... B29C 64/40; B29C 64/209; B29C 64/264; B29C 64/106; B22F 10/10; B22F 10/16; F16C 3/00; F16C 3/023
See application file for complete search history.

(56) References Cited

U.S. PATENT DOCUMENTS

| | | | |
|---|---|---|---|
| 5,474,408 A | 12/1995 | Dinitz et al. | |
| 5,555,481 A * | 9/1996 | Rock | B29C 64/40 419/45 |
| 8,375,652 B2 | 2/2013 | Hiriyur et al. | |
| 8,596,393 B2 | 12/2013 | Yoshizue et al. | |
| 2008/0148681 A1 | 6/2008 | Hiriyur et al. | |
| 2011/0144848 A1 | 6/2011 | Yoshizue et al. | |
| 2011/0179725 A1 | 7/2011 | Hiriyur et al. | |
| 2014/0134334 A1* | 5/2014 | Pridoehl | B33Y 70/00 427/256 |
| 2015/0044084 A1* | 2/2015 | Hofmann | B05D 1/18 264/642 |
| 2016/0009029 A1* | 1/2016 | Cohen | B29C 64/209 264/250 |
| 2016/0229125 A1* | 8/2016 | Bienzobas Saffie | D01D 5/00 |
| 2017/0113276 A1 | 4/2017 | Hullen et al. | |
| 2017/0136706 A1* | 5/2017 | Hakkaku | B33Y 30/00 |

FOREIGN PATENT DOCUMENTS

FR 2654163 A1 5/1991

* cited by examiner

*Primary Examiner* — Daniel J Wiley
(74) *Attorney, Agent, or Firm* — Bachman & LaPointe, P.C.

(57) ABSTRACT

A shaft can include a first portion comprising a first material having first material properties, a disconnect portion comprising at least some of a second material having second material properties, and a third portion comprising a third material having third material properties. The disconnect portion can be positioned between the first portion and the third portion, the three material properties being configured such that the first portion is physically disconnected from the third portion in response to failure of the disconnect portion under at least one of a mechanical load and/or an electrical load and/or thermal load.

17 Claims, 1 Drawing Sheet

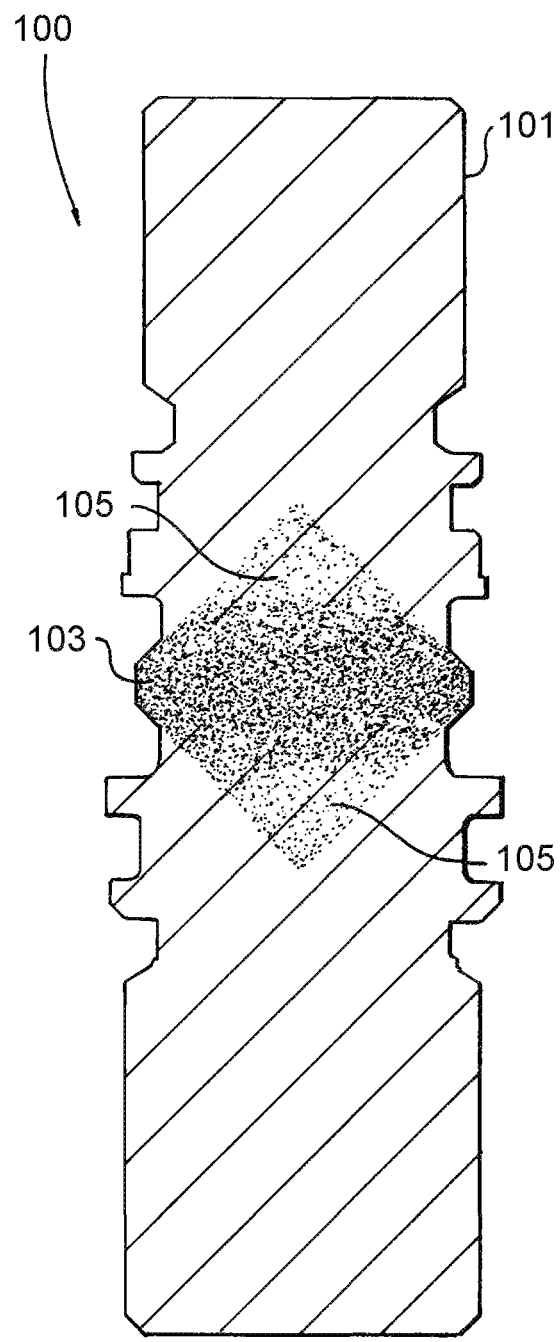

SHAFT DISCONNECTS

CROSS-REFERENCE TO RELATED APPLICATIONS

This application is a divisional of U.S. patent application Ser. No. 15/487,160, filed Apr. 13, 2017, the entire content of which is incorporated herein in its entirety.

BACKGROUND

1. Field

The present disclosure relates to shafts, more specifically to shaft disconnects (e.g., for electrical machine shafts).

2. Description of Related Art

Thermal/over-torque disconnect can be a desired feature in certain shafts which allow a shaft to shear under certain overheat or over-torque conditions. Traditional designs for such disconnects include a thinned portion of the shaft and/or a mechanical disconnect with a melt engaged trigger. There is not always space for a conventional design.

Such conventional methods and systems have generally been considered satisfactory for their intended purpose. However, there is still a need in the art for improved shaft disconnects. The present disclosure provides a solution for this need.

SUMMARY

In accordance with at least one aspect of this disclosure, a shaft can include a first portion comprising a first material having first material properties, a disconnect portion comprising at least some of a second material having second material properties, and a third portion comprising a third material having third material properties. The disconnect portion can be positioned between the first portion and the third portion, the three material properties being configured such that the first portion is physically disconnected from the third portion in response to failure of the disconnect portion under at least one of a mechanical load and/or an electrical load and/or thermal load.

The disconnect portion can include a radius equal to or greater than the first portion. The second material properties can include a second melting point and/or softening temperature and/or a second shear strength that is less than a first melting point and/or softening temperature and/or a first shear strength of the third material properties. The first material can be the same as the third material. The shaft can be manufactured in a continuous process.

In accordance with at least one aspect of this disclosure, a shaft can include a first portion comprising a first material having a first material strength, and a disconnect portion disposed at one or can include more portions of the shaft and connected to the first portion. The disconnect portion can include a second material having a second material strength less than the first material strength such that the disconnect portion is configured to shear under one or more predetermined operational conditions.

The disconnect portion can include a radius equal to or greater than the first material portion. The first material strength can include a first melting point and/or softening temperature and/or a first shear strength. The second material properties can include a second melting point and/or softening temperature and/or a second shear strength.

In certain embodiments, the disconnect portion can include a gradient portion wherein the first material and the second material are blended. In certain embodiments, a content of the second material in the gradient portion can increase along a shaft length direction.

The disconnect portion can include a non-cylindrical shape of the second material. The disconnect portion can include a diamond shaped cross-portion of the second material. For example, in certain embodiments, the disconnect portion can include a double cone shape. Any suitable shape is contemplated herein. The second material can be most concentrated at a base of the double cone shape, for example.

In accordance with at least one aspect of this disclosure, a method for additively manufacturing a shaft having a shear disconnect includes additively manufacturing a first material in a partial shaft shape, additively manufacturing a disconnect portion onto the partial shaft shape using a second material, and additively manufacturing the first material on the disconnect portion to complete the shaft. Additively manufacturing the disconnect portion can include progressively adding the second material to the first material to create at least one gradient portion. Additively manufacturing the disconnect portion includes using the second material exclusively for a portion of the disconnect portion.

Additively manufacturing the disconnect portion includes shaping the disconnect portion in a non-cylindrical shape. Shaping the disconnect portion into a non-cylindrical shape includes shaping the disconnect portion to include a double conical shape.

In accordance with at least one aspect of this disclosure, an electrical machine can include a shaft as described above. The electrical machine can be an electric motor and/or electric generator and can include any other suitable components as appreciated by those having ordinary skill in the art.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is an elevation view of an embodiment of a shaft in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a shaft in accordance with the disclosure is shown in FIG. 1 and is designated generally by reference character 100. The systems and methods described herein can be used to provide shafts with a disconnect portion (e.g., to prevent thermal overheat damage or overspeed damage to an electrical machine).

Referring to FIG. 1, a shaft 100 can include a first portion 101 comprising a first material having a first material strength. The shaft 100 can include a disconnect portion 103 disposed at one or more portions of the shaft 100 (e.g., at a midsection as shown) and connected to the first portion 101. The disconnect portion 103 can include a second material having a second material strength less than the first material strength such that the disconnect portion 103 is configured to shear under one or more predetermined operational conditions (e.g., overheat or over-torque). The second material can include any suitable material or mixture thereof (e.g., partly the first material and partly one or more other materials, entirely one or more other materials than the first material).

For example, if the disconnect portion 103 is exposed to excess heat, the second material can lose rigidity and shear. In another example, if the disconnect portion 103 experiences a predetermined torque or speed, the second material can shear causing disconnect. In this regard, the first material strength can include a first melting point and/or softening temperature and/or a first shear strength and the second material strength can include a second melting point and/or softening temperature less than the first material and/or a second shear strength less than the first material.

The disconnect portion 103 can include a radius equal to or greater than the first material portion 101. Any other suitable maximum radius is contemplated herein.

In certain embodiments, the disconnect portion 103 can include one or more gradient portions 105 wherein the first material and the second material are blended. In certain embodiments, a content of the second material in the gradient portion 105 can increase along a shaft length direction (e.g., to a maximum concentration after which concentration can reduce again in another gradient portion 105 with respect to the shaft length direction). The shaft length direction is vertical in FIG. 1. While a gradient portion 105 is shown, it is not necessary (e.g., the material can be disposed in a step function).

The disconnect portion 103 can include a non-cylindrical shape of the second material. The disconnect portion 103 can include a diamond shaped cross-portion of the second material. For example, in certain embodiments, the disconnect portion 103 can include a double cone shape as shown. Any suitable shape (e.g., spherical, cubical, tetrahedral) is contemplated herein. The shape can be symmetric about the rotating axis (e.g., for balancing reasons). As shown, the second material can be most concentrated at a base of the double cone shape, for example.

As described above, the shaft 100 can include a first portion 101 comprising a first material having first material properties, a disconnect portion 103 comprising at least some of a second material having second material properties, and a third portion (e.g., the bottom end of the shaft 100 as shown in FIG. 1) including a third material (e.g., the first material) having third material properties. In certain embodiments, this third portion may be referred to as part of the first portion 101 as described above.

In certain embodiments, the disconnect portion 103 can be positioned between the first portion and the third portion. It is contemplated that the disconnect portion 103 need not be positioned between a first portion 101 and another material portion (e.g., whether referred to as in the middle of a first portion 101 or with a separately defined third portion) such that the disconnect section 103 may be at an end of the shaft 100.

The three material properties of the first, second, and third portions can be configured such that the first portion 101 is physically disconnected from the third portion in response to failure of the disconnect portion 103 under at least one of a mechanical load and/or an electrical load and/or thermal load. The second material properties can include a second melting point and/or softening temperature and/or a second shear strength that is less than a first melting point and/or softening temperature and/or a first shear strength of the third material properties.

In certain embodiments, the first material can be the same as the third material (e.g., such that the second material is position between two portions of first material). Embodiments of the shaft 100 can be manufactured in a continuous process.

In accordance with at least one aspect of this disclosure, a method for additively manufacturing a shaft having a shear disconnect includes additively manufacturing a first material in a partial shaft shape, additively manufacturing a disconnect portion onto the partial shaft shape using a second material, and additively manufacturing the first material on the disconnect portion to complete the shaft. Additively manufacturing the disconnect portion can include progressively adding the second material to the first material to create at least one gradient portion. Additively manufacturing the disconnect portion includes using the second material exclusively for a portion of the disconnect portion.

Additively manufacturing the disconnect portion includes shaping the disconnect portion in a non-cylindrical shape. Shaping the disconnect portion into a non-cylindrical shape includes shaping the disconnect portion to include a double conical shape. While additive manufacturing is described, any suitable manufacturing method is contemplated herein (e.g., welding).

In accordance with at least one aspect of this disclosure, an electrical machine can include any suitable embodiment of a shaft 100 as described above. The electrical machine can be an electric motor and/or electric generator and can include any other suitable components as appreciated by those having ordinary skill in the art. The shaft 100 can be the inner most shaft of an electrical generator, for example.

As described above, the second material can be not as strong as the first material and thus need not be a thinned out portion as used in traditional shear sections. Moreover, the second material can additionally or alternatively melt at a predetermined temperature to cause thermal disconnect.

The methods and systems of the present disclosure, as described above and shown in the drawings, provide for shafts with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for additively manufacturing a shaft having a shear disconnect, comprising:
   additively manufacturing a first material in a partial shaft shape;
   additively manufacturing a disconnect portion onto the partial shaft shape using a second material; and
   additively manufacturing the first material on the disconnect portion to complete the shaft, wherein:
   the additively manufacturing the disconnect portion includes progressively adding the second material to the first material to create at least one gradient portion;
   the additively manufacturing the disconnect portion includes using the second material exclusively for a portion of the disconnect portion; and
   the additively manufacturing the disconnect portion includes shaping the disconnect portion in a non-cylindrical shape including a double conical shape.

2. The method of claim 1, wherein a concentration of the second material is highest at a base of the double conical shape.

3. The method of claim 2, wherein the first material has a first material strength and the second material has a second material strength less than the first material strength.

4. The method of claim 1 wherein the first material has a first material strength and the second material has a second material strength less than the first material strength.

5. The method of claim 1 wherein the first material has a first melting point and the second material has a second melting point lower than the first melting point.

6. A method for additively manufacturing a shaft having a shear disconnect, comprising:
   additively manufacturing a first material in a partial shaft shape;
   additively manufacturing a disconnect portion onto the partial shaft shape using a second material; and
   additively manufacturing the first material on the disconnect portion to complete the shaft, wherein:
   the additively manufacturing the disconnect portion includes shaping the disconnect portion in a non-cylindrical shape including a double conical shape.

7. The method of claim 6 wherein:
   the first material has a first material strength and the second material has a second material strength less than the first material strength.

8. The method of claim 7 wherein:
   a concentration of the second material is highest at a base of the double conical shape.

9. The method of claim 6 wherein:
   the first material has a first melting point and the second material has a second melting point lower than the first melting point.

10. The method of claim 9 wherein:
    a concentration of the second material is highest at a base of the double conical shape.

11. The method of claim 6 wherein:
    a concentration of the second material is highest at a base of the double conical shape.

12. A method for additively manufacturing a shaft having a shear disconnect, comprising:
    a step for additively manufacturing a first material in a partial shaft shape to form a first end portion;
    a step for additively manufacturing a disconnect portion onto the partial shaft shape having a progressive gradient between the first material and a second material; and
    a step for additively manufacturing the first material on the disconnect portion to form a second end portion.

13. The method of claim 12 wherein:
    the first material has a first material strength and the second material has a second material strength less than the first material strength.

14. The method of claim 13 wherein:
    a concentration of the second material is highest at a center of the disconnect portion.

15. The method of claim 12 wherein:
    the first material has a first melting point and the second material has a second melting point lower than the first melting point.

16. The method of claim 15 wherein:
    a concentration of the second material is highest at a center of the disconnect portion.

17. The method of claim 12 wherein:
    a concentration of the second material is highest at a center of the disconnect portion.

* * * * *